Oct. 28, 1947.   R. L. WILLENBERG   2,429,737
RUNNER FOR WHEELED VEHICLES
Filed March 19, 1946
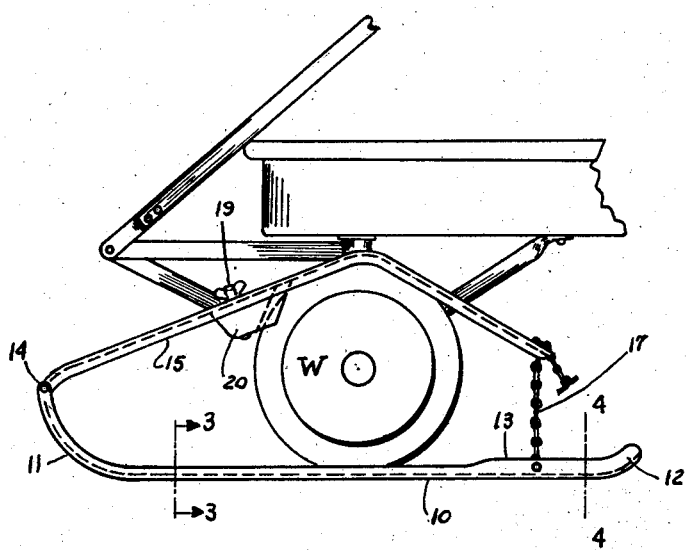
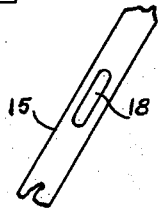
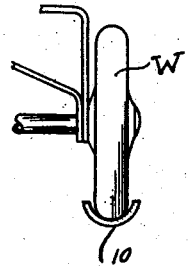
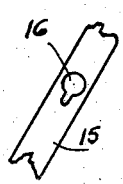
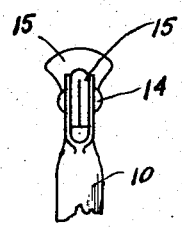
INVENTOR.
ROBERT L. WILLENBERG
BY
ATTORNEY'S Patented Oct. 28, 1947

2,429,737

UNITED STATES PATENT OFFICE 2,429,737

RUNNER FOR WHEELED VEHICLES

Robert L. Willenberg, Detroit, Mich.

Application March 19, 1946, Serial No. 655,618

2 Claims. (Cl. 280—13)

The present invention relates to runners for wheeled vehicles and more particularly to a runner attachment which can be readily installed on the wheels.

The primary object of the invention is to provide an attachable snow runner which will pass over ordinary road inequalities and also will function well when the vehicle travels in reverse.

Another object of the invention is to provide a non-skid runner.

A further object of the invention is to provide a runner of simpler and more compact construction than is disclosed in prior devices.

With the foregoing and other objects and advantages in view the invention consists of the novel construction and arrangement of parts hereinafter described and claimed.

In the accompanying drawing illustrating the preferred embodiment of the invention—

Figure 1 is a side elevation of the invention in operative position on a child's wagon.

Figure 2 is a fragmentary top plan view of the hinged wheel-clamping member, showing the adjustment slot for the wheel chock.

Figure 3 is a section of the runner on line 3—3 of Figure 1.

Figure 4 is a section of the runner on line 4—4 of Figure 1.

Figure 5 is a fragmentary top plan view of the rear part of the wheel-clamping member, showing the slot to secure the tie-chain.

Figure 6 is a fragmentary front elevation of the hinge-joint between the runner and wheel-clamping member.

Like numerals are used in the description and drawing to designate the same parts of construction.

The runner proper is constructed with a suitable length of material 10, preferably steel, which is curvilinear in cross-section, as shown in Figure 3. As used herein it provides a convenient channel for rubber-tired wheels W. The forward part of the runner is curved upwardly, as at 11, to readily pass over road obstacles and other inequalities of the surface. At the rear end the runner is curved upwardly as indicated at 12 to facilitate rearward movement of the vehicle and its sides are compressed as at 13 in Figure 4 from the end forwardly a suitable distance to prevent the runner from skidding on icy surfaces. Hinged to the end of the front of the runner, by a pivot bolt 14, is the forward extremity of a grooved clamping member 15 which is arched and extends over wheel W and to the rear thereof. This member is positioned with its longitudinal groove under and is designed to be clamped down on the wheel to hold the runner in place.

At the rear end thereof the clamping member is provided with a key-hole slot 16 for reception of a tie-chain 17 which is fastened to the rear end of the runner. A link chain is preferable as it permits an adjustable tie between clamp member and runner, thus attaching same securely to the wheel.

In front of the wheel position the clamping member 15 is provided with a longitudinal slot 18 for reception of a bolt 19 which projects from the top of an adjustable block 20 which serves as a chock. Bolt 19 is provided with a wing-nut to facilitate its adjustment in slot 18 to suit different sizes of wheels. To detach this snow runner the tie chain 17 is disengaged from slot 16 in the clamping member and the latter is removed from the wheel.

As different embodiments may be made of this inventive concept and modifications may be made in the embodiment hereinbefore shown and described, it will be understood that the matter herein is to be interpreted as illustrative merely, and not in a limiting sense.

What I claim is:

1. An attachment for wheeled vehicles, comprising a runner of arcuate cross-sectional configuration adapted to engage the wheel of a vehicle on the underside thereof and having an upwardly turned forward end, a wheel clamping member pivotally secured to the upturned forward end, said clamping member having an elongated slot and a key-hole slot therein, a chock releasably secured to the said clamping member adjacent said elongated slot for linear adjustment relative thereto, and a chain secured at one end to an intermediate point of said runner and having its other end adapted for locking engagement in said key-hole slot, a portion of said runner being compressed to provide anchoring means for said one end of said chain.

2. An attachment for wheeled vehicles, comprising a runner of arcuate cross-sectional configuration adapted to engage the wheel of a vehicle on the underside thereof and having an upwardly turned forward end, a wheel clamping member pivotally secured to the upturned forward end, said clamping member having an elongated slot and a key-hole slot therein, a chock releasably secured to the said clamping member adjacent said elongated slot for linear adjustment relative thereto, a chain secured at one end to an intermediate point of said runner and having its other end adapted for locking engagement in said key-hole slot, a portion of said runner being compressed to provide anchoring means for said end of said chain, and a second upturned portion on said runner rearwardly of said chain to permit rearward movement of the vehicle.

ROBERT L. WILLENBERG.

REFERENCES CITED

The following references are of record in the file of this patent:

UNITED STATES PATENTS

| Number | Name | Date |
|---|---|---|
| 1,005,683 | Bowers et al. | Oct. 10, 1911 |
| 1,095,381 | Clark | May 5, 1914 |
| 1,313,823 | Kelly | Aug. 19, 1919 |